(12) United States Patent
Kothari et al.

(10) Patent No.: US 9,117,116 B1
(45) Date of Patent: Aug. 25, 2015

(54) METHOD AND APPARATUS FOR MANAGING DEADLINE CONTENT IN A DOCUMENT

(71) Applicant: Adobe Systems Incorporated, San Jose, CA (US)

(72) Inventors: Anshul Kothari, New Delhi (IN); Lalit Vohra, New Delhi (IN); Saurabh Rihan, Noida (IN); Ram Bhushan Agrawal, Noida (IN)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 52 days.

(21) Appl. No.: 14/226,112

(22) Filed: Mar. 26, 2014

(51) Int. Cl.
*G06K 9/00* (2006.01)

(52) U.S. Cl.
CPC .................................. *G06K 9/00449* (2013.01)

(58) Field of Classification Search
CPC .................................................. G06K 9/00449
USPC ........................................................... 382/100
See application file for complete search history.

(56) References Cited

U.S. PATENT DOCUMENTS 8,910,067 B1 * 12/2014 Anderson ...................... 715/765
2008/0184033 A1 * 7/2008 Daniels et al. ................ 713/175

* cited by examiner

*Primary Examiner* — Gregory F Cunningham
(74) *Attorney, Agent, or Firm* — Keller Jolley Preece

(57) ABSTRACT

A computer implemented method and apparatus for managing deadline content in a document. The method comprises extracting deadline content from a document; comparing the extracted deadline content to content in one or more existing deadline profiles; and providing for storage on a cloud server, at least one of the extracted deadline content when the extracted deadline content matches the content in an existing deadline profile, or the extracted deadline content and a new deadline profile for the document when the extracted deadline content does not match an existing deadline profile.

20 Claims, 3 Drawing Sheets

METHOD AND APPARATUS FOR MANAGING DEADLINE CONTENT IN A DOCUMENT

BACKGROUND OF THE INVENTION

1. Field of the Invention

Embodiments of the present invention generally relate to document management and, more particularly, to techniques for managing deadline content in a document.

2. Description of the Related Art

Many computer users receive electronic billing statements via e-mail. Alternatively, the billing statements may be paper documents that a user has scanned into a computer to create an electronic version of the billing statement. These users often store their electronic billing statements in a web document repository, for example, Acrobat.com. A user may have a substantial number of statements from various vendors, each with different deadlines for payment and different billing cycles, such as monthly or quarterly. Currently, there is no standard followed by vendors that provides consistent billing information in a billing statement. Hence, a payment deadline in addition to other deadline information, such as an amount due and the like (hereafter referred to as "deadline content") cannot be automatically extracted from the documents sent by different vendors. As such, billing deadlines are tracked manually by the user, resulting in wasted time and possible late payment of bills. Therefore, there is a need for a method and apparatus for managing deadline content in a document.

SUMMARY OF THE INVENTION

The Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A method for managing deadline content in a document is described. The method extracts deadline content from a document. The deadline content is compared to one or more deadline profiles. If the deadline content matches one of the deadline profiles, the extracted deadline content is provide for storage. However, if the deadline content does not match one of the deadline provides, a new deadline profile is created for the document. The method then provides the deadline content and new deadline profile for storage.

In another embodiment, an apparatus for managing deadline content in a document is described. The apparatus comprises a deadline processing module for extracting deadline content from a document. The deadline processing module compares the extracted deadline content to content in one or more existing deadline profiles. If the deadline content matches one of the deadline profiles, the deadline processing module provides the extracted deadline content for storage. However, if the deadline content does not match one of the deadline profiles, the deadline processing module creates a new deadline profile for the document and then provides the deadline content and new deadline profile for storage.

In yet another embodiment, a computer readable medium for managing deadline content in a document is described. The computer readable medium stores computer instructions that, when executed by at least one processor causes the at least one processor to perform the method for managing deadline content in a document.

Figure 1:
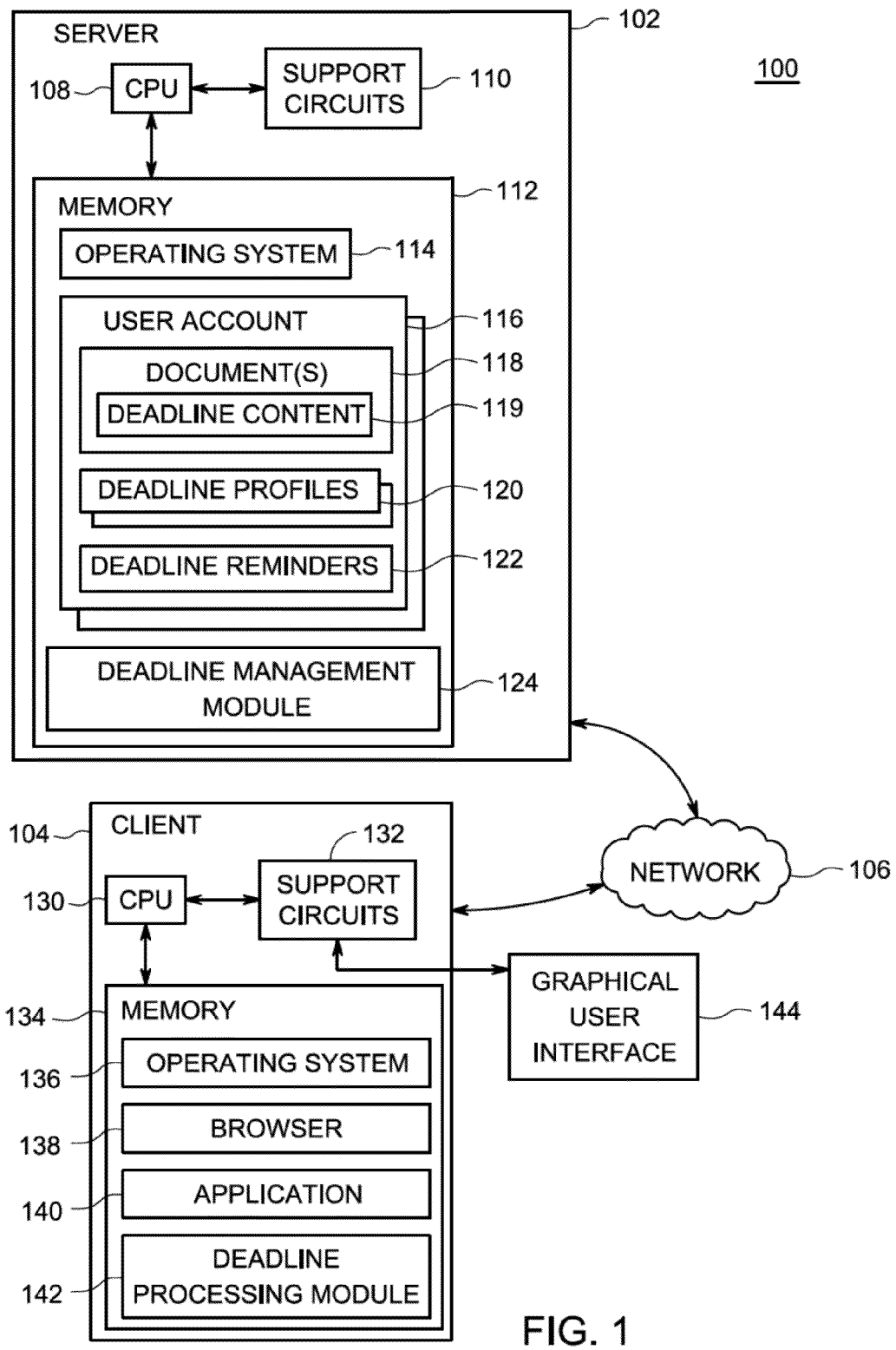
FIG. 1 is a block diagram of a system for managing deadline content in a document, according to one or more embodiments.

While the method and apparatus is described herein by way of example for several embodiments and illustrative drawings, those skilled in the art will recognize that the method and apparatus for managing deadline content in a document is not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the method and apparatus for managing deadline content in a document defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

As previously explained, existing solutions fail to track deadlines in documents in an automated fashion. The existing solutions require manual intervention by the user each time a document is received.

Thus, and in accordance with an embodiment of the present invention, techniques are provided herein that allow for identifying, managing, and tracking deadlines in a document. Although the examples in the present disclosure refer to billing statements, it is appreciated that the invention may be applied to any type of electronic document that includes a deadline. A user's documents are stored in a document repository, such as Acrobat.com. Documents may be received electronically, for example, in an e-mail, or received as a paper document and scanned into a computer. The user opens a new document with e-reader software, for example ACROBAT, ADOBE READER, and the like, capable of viewing electronic documents. When the user opens the new document, deadline profiles are retrieved from the document repository. The deadline profiles were created from documents previously stored by the user. A deadline profile is a file that represents information for a specific type of document (e.g., a monthly cellular telephone bill from AT&T). For example, a deadline profile for a cellular telephone bill may include a page number, value (such as a due date or amount of money due), and location on the page number where that value is positioned. Deadline content of the new document, corresponding to the content required for the deadline profile, is extracted and compared to the deadline profiles previously stored in the document repository of the user. If a type of content and the location of content are semantically the same, the extracted content is considered a match. For example, if the content in the new document is in a date format and the location of the date is in the same location as specified in the previously stored deadline profile, the content is considered a match. If the content of the new document matches a deadline profile, the deadline content of the new document is added to a list of the user's deadlines.

However, if the extracted content from the new document does not match any deadline profiles, all dates within the document are identified and the user is prompted to select the date that represents a due date. In addition, the user may select additional content extracted from the document to be stored in the deadline profile. For example, the user may select an amount due field and a minimum payment due field to be stored with the due date in the deadline profile. The due date and additional content is stored in a new deadline profile and the deadline content is added to the list of the user's deadlines.

The user may view the deadline content in a method of their choosing. For example, the user may view their deadline content in a spreadsheet. Reminders are sent to the user periodically. In some embodiments the frequency of the reminders increases as a due date approaches.

As used herein, a document may be any type of file that includes a deadline, such as a billing statement.

Advantageously, the present invention may be a plug-in to an e-reader software application, such as ACROBAT, ADOBE READER, and the like. The present invention allows users to track their deadlines for various bills from any device. The present invention may be integrated with any notification system, such as GOOGLE Calendar, OUTLOOK, or FACEBOOK notifications such that reminders are automatically provided to the user. As such, a user is freed of manually tracking due dates and less likely to miss their deadlines.

Various embodiments of a method and apparatus for managing deadline content in a document are described. In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description that follow are presented in terms of algorithms or symbolic representations of operations on binary digital signals stored within a memory of a specific apparatus or special purpose computing device or platform. In the context of this particular specification, the term specific apparatus or the like includes a general-purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

FIG. 1 is a block diagram of a system 100 for managing deadline content in a document, according to one or more embodiments. The system 100 includes a server 102 and a client 104, communicatively coupled to one another via a network 106. The server 102 may be in the cloud. Examples of the server 102 include, but are not limited to a blade server, virtual machine, and the like. Additional examples of the server 102 include, but are not limited to desktop computers, laptops, tablet computers, Smartphones, and the like. In one embodiment, the server 102 is a cloud repository, such as ADOBE Document Cloud. The server 102 includes a Central Processing Unit (CPU) 108, support circuits 110, and a memory 112. The CPU 108 may include one or more commercially available microprocessors or microcontrollers that facilitate data processing and storage. The various support circuits 110 facilitate the operation of the CPU 108 and include one or more clock circuits, power supplies, cache, input/output circuits, and the like. The memory 112 includes at least one of Read Only Memory (ROM), Random Access Memory (RAM), disk drive storage, optical storage, removable storage and/or the like.

The memory 112 includes an operating system 114, a plurality of user accounts 116, and a deadline management module 124. Each user account 116 includes one or more documents 118, one or more deadline profiles 120 and deadline reminders 122. Each document 118 includes deadline content 119. Deadline content 119 includes a payment deadline in addition to other deadline information, such as an amount due and the like. The operating system 114 may include various commercially known operating systems.

The client 104 is a computing device, such as a desktop computer, laptop, tablet computer, Smartphone, and the like. The client 104 includes a Central Processing Unit (CPU) 130, support circuits 132, and a memory 134 and includes or is connected to a graphical user interface 144. The CPU 130 may include one or more commercially available microprocessors or microcontrollers that facilitate data processing and storage. The various support circuits 132 facilitate the operation of the CPU 130 and include one or more clock circuits, power supplies, cache, input/output circuits, and the like. The memory 134 includes at least one of Read Only Memory (ROM), Random Access Memory (RAM), disk drive storage, optical storage, removable storage and/or the like.

The memory 134 includes an operating system 136, a browser 138, an application 140, and a deadline processing module 142. The operating system 136 may include various commercially known operating systems. The application 140 may be any e-reader application. The application 140 may reside on the client 104, such as ACROBAT, ADOBE READER MOBILE, and the like. Alternatively, the user may access an e-reader application via the browser 138 while viewing a document on the Internet. For example, Acrobat.com provides an online service for storing and accessing documents.

The network 106 includes a communication system that connects computers (or devices) by wire, cable, fiber optic and/or wireless link facilitated by various types of well-known network elements, such as hubs, switches, routers, and the like. The network 106 may be a part of the Intranet using various communications infrastructure, such as Ethernet, Wi- Fi, a personal area network (PAN), a wireless PAN, Bluetooth, Near field communication, and the like.

A user opens a document using application 140. The user has an associated user account 116 on the server 102 that manages storage of the user's documents 118. The deadline processing module 142 sends a request to the server 102 for the deadline profiles 120 associated with the user's account 116. The deadline management module 124 processes the request and sends the user's deadline profiles 120 to the client 104. For each deadline profile 120, the deadline processing module 142 compares the data in the deadline profile 120 to deadline content 119 extracted from the new document. For example, a deadline profile 120 may include a due date field on page 2 of the document at a given location on page 2. The deadline processing module 142 accesses page 2 of the new document to determine whether, at the location specified in the deadline profile 120, there exist data that is in the format of a date field. If the page, format, and location match, the deadline processing module 142 proceeds to determine whether other content in deadline profile 120 matches the page, location, and format of content in the new document. If all content in the deadline profile 120 matches the content in the new document, the deadline processing module 142 sends the deadline content 119 extracted from the new document to the server 102, where the deadline management module 124 stores the content in the deadline reminders 122.

However, if the deadline processing module 142 does not find a deadline profile 120 having deadline content 119 that matches the extracted deadline content 119 in the new document, then the deadline processing module 142 identifies content in the new document that has a date format. The deadline processing module 142 displays the document on the graphical user interface 144 and prompts the user to select deadline content 119 that identifies a date that represents a due date and any additional content the user may wish to have stored in a new deadline profile 120. The deadline processing module 142 generates the new deadline profile. In some embodiments, the new deadline profile is named in such a manner that the document name may be associated with the new deadline profile, for example, using a keyword common to both the new deadline profile and the document name. The deadline processing module 142 sends it to the server 102, where the deadline management module 124 stores the deadline profile 120. The deadline processing module 142 then sends the extracted deadline content 119 from the new document to the server 102, where the deadline management module 124 stores the deadline content 119 in the deadline reminders 122.

The user may access the deadline reminders 122 via the graphical user interface 144. The deadline management module 124 periodically accesses the deadline reminders 122 and sends reminders to the user. The deadline management module 124 sends reminders to the user at pre-defined times, and in some embodiments, with the frequency of the reminders increasing as the deadline date approaches.

In some embodiments, the deadline management module 124 resides on client 104. In such embodiments, all functions of the deadline management module 124 are performed on the client 104. In such embodiments, while no user account 116 is required on the client 104, documents 118, deadline profiles 120 and deadline reminders 122 are stored in the memory 134 of the client 104.

Figure 2:
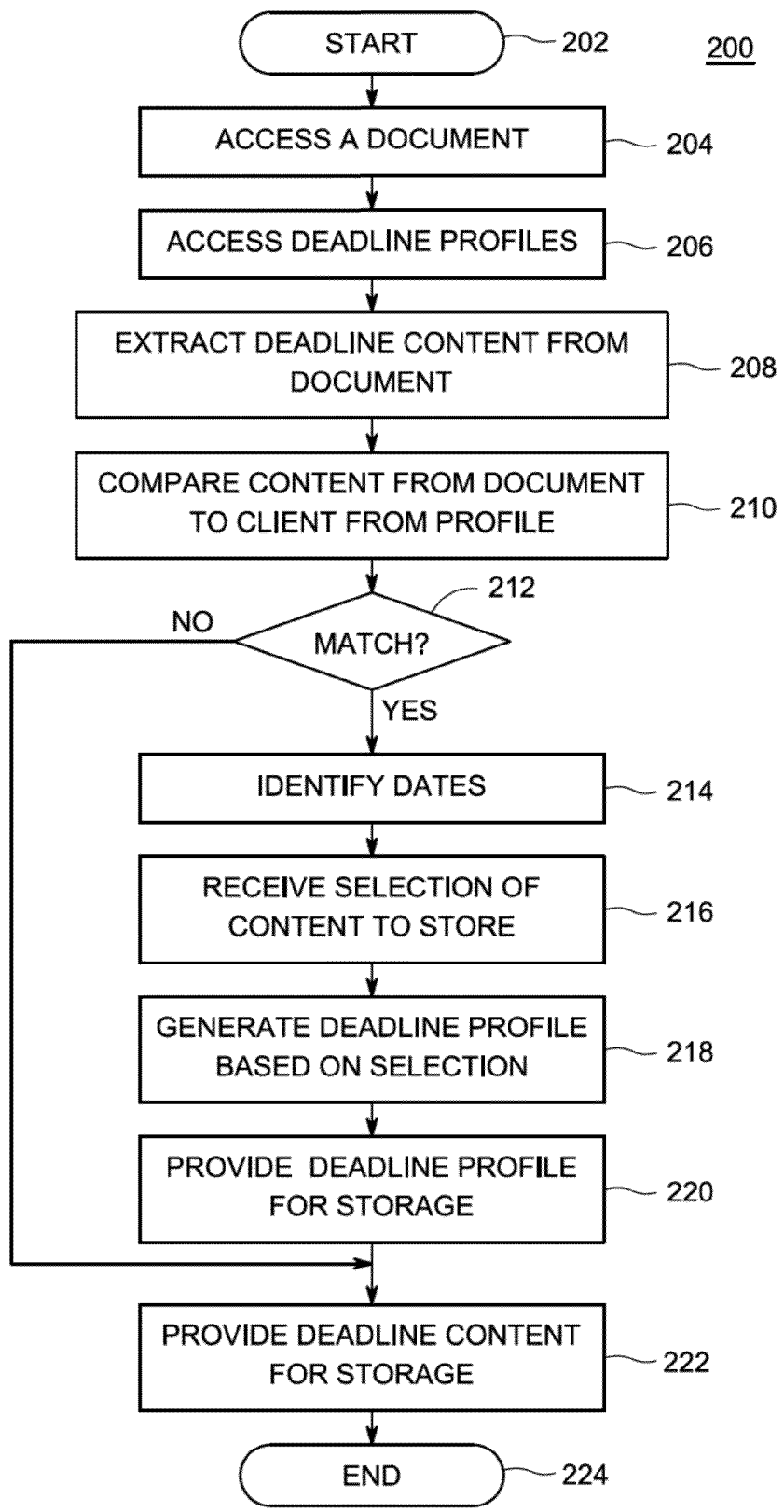
FIG. 2 depicts a flow diagram of a method for managing deadline content in a document, as performed by the deadline processing module of FIG. 1, according to one or more embodiments.

FIG. 2 depicts a flow diagram of a method 200 for managing deadline content in a document, as performed by the deadline processing module 142 of FIG. 1, according to one or more embodiments. The method 200 extracts deadlines from documents, generates deadline profiles, and sends the extracted deadline information and generated deadline profiles for storage. In some embodiments, the method 200 is performed on a server. In some embodiments, where documents are stored locally on a user device, the method 200 is performed on the user device. The method 200 starts at step 202 and proceeds to step 204.

At step 204, the method 200 accesses a document. In one embodiment, the document is accessed in response to a user opening the document using a software application. In another embodiment, the document is received from a vendor via email and automatically stored in the user's document repository. Documents that are automatically stored in the user's document repository can be accessed without user intervention. A rule or option can be used to enable this. The document may be any digital document that includes deadline information. For example, the document may be a monthly cellular telephone bill that was received via an e-mail. The document is accessed using e-reader software, for example, ACROBAT or ADOBE READER.

The method 200 proceeds to step 206, where the method 200 accesses deadline profiles for previously viewed documents. In some embodiments, the deadline profiles are stored in a user's account on a server and include only deadline profiles for previously viewed documents of the user. In some embodiments, the deadline profiles are global and include all deadline profiles for previously viewed document of all users. In such embodiments, deadline profiles may be shared and used for comparison by all users. In some embodiments, the deadline profiles are stored locally on a user's device. Each deadline profile is associated with a specific type of document. For example, a first deadline profile may be for an electric bill from CompanyA. A second deadline profile may be for a credit card bill from CompanyB. A sample deadline profile may be as follows:

```
{
    name:"AT&T",
    bboxes : [
        {
            pagenum: 1,
            value: "12-09-2013",
            bbox: {top:45, left:90, bottom:59, right:112}
        },
        {
            pagenum: 1,
            value: "Amount Due: 998.23",
            bbox: {top:95, left:257, bottom:109, right:283}
        }
    ]
}
```

The sample deadline profile content includes the originator of the document, in this example, "AT&T". The sample deadline profile content also includes the page number, a value, and location on the page of the bounding box for the value. In this example, the due date and amount due to AT&T are stored in the deadline profile, along with the location on the page where these values are positioned.

The method 200 proceeds to step 208, where the method 200 extracts deadline content from the document. For each location in a deadline profile, the method 200 extracts the content at said location in the document.

The method 200 proceeds to step 210, where the method 200 compares each item of content in the deadline profile with the content in the document. The method 200 attempts to determine if a similar document has previously been received. The method 200 identifies a first location in the deadline profile and a value for said location. The method 200 then extracts the content from the identified first location in the document. The method 200 determines if the value and the extracted content at the first location are similar Using the present example, the method 200 determines if on page 1 of the document, there is a date at the location of the bounding box: top:45, left:90, bottom:59, right:112. If there is a date at the location of the bounding box in the document, the method 200 determines if on page 1 of the document, there is a value of "Amount Due: 998.23" at the location of the bounding box: top:95, left:257, bottom:109, right:283. The value need not match exactly. The value merely needs to be semantically equivalent. For example, if the value is a string, for example, "Amt. Due" followed by a floating point decimal, such as 871.12, then the values are considered to be a match. If the content from the identified first location matches, a second location in the deadline profile is identified along with the value. The method 200 then extracts the content from the identified second location and determines if the value and the extracted content at the second location are similar. If each item of content in the deadline profile is determined to be semantically equivalent to the content in the document, the document is determined to be a match. If there is not a match, the method 200 compares the document against other deadline profiles of the user until a match is found or until all deadline profiles are exhausted.

The method 200 proceeds to step 212, where the method 200 determines whether a match was found between the document and the deadline profiles of the user. If the method 200 determines that a match was found, the method 200 extracts the deadline content from the document that is specified in the deadline profile. In the present example, the method 200 extracts the due date and the amount due from the document and the method 200 proceeds to step 222.

However, if at step 212, the method 200 determines that a match was not found and all deadline profiles of the user are exhausted, the method 200 proceeds to step 214. In some embodiments, if there are no deadline profiles stored in the user profile, the method 200 moves directly to step 214. The deadline profiles may not exist for various reasons, for example, if the user is a new user accessing the user account for the first time. At step 214, the method 200 identifies dates in the document. The method 200 searches the document for any expressions that are in a date format. Example date formats include, but are not limited to: mm-dd-yyyy, mm/dd/yyyy, (jan|feb| . . . |dec)/dd/yyyy, and the like. One or more date fields may be found. For example, a credit card statement may include the date of the statement, a date for the end of a billing cycle, a date when payment is due.

The method 200 proceeds to step 216, where the method 200 receives a selection of which date should be used as the due date to be stored as a deadline. The method 200 displays the document with one or more date fields identified as possible due dates. The method 200 receives user input that identifies a due date. The method 200 may also receive a user selection of content (i.e. deadline information) that are to be included in the deadline profile and deadline information. The user may select any additional deadline information including other dates, for example, a billing date or a last payment received date or any content present in the document. This is helpful should a user wish to create two different profiles for a same vendor but for different services, (e.g., a mobile phone bill and an internet bill), where the only difference is the billing date and the rest of the document details are the same. For example, for a mobile phone bill, the user may select a total amount due and a minimum amount due in addition to the due date. The user may also select a billing date. For an internet bill from the same vendor, the user may select a total amount due and a minimum amount due in addition to the due date and a billing date. The method 200 extracts the selected content from the document.

The method 200 proceeds to step 218, where the method 200 generates a deadline profile based on the selected content. The method 200 proceeds to step 220, where the method 200 provides the deadline profile for storage. In some embodiments, the method 200 sends a request to a server to store the deadline profile under the user's account. In some embodiments, the method 200 stores the deadline profile locally on a user's device. The method 200 proceeds to step 222.

At step 222, the method 200 provides the deadline information for storage. In some embodiments, the method 200 sends a request to the server to store the deadline information under the user's account. In some embodiments, the method 200 stores the deadline information locally on the user's device. Once the deadline information is stored, the deadline information may be viewed by the user or used to send reminders to the user. The method 200 proceeds to step 224 and ends.

Figure 3:
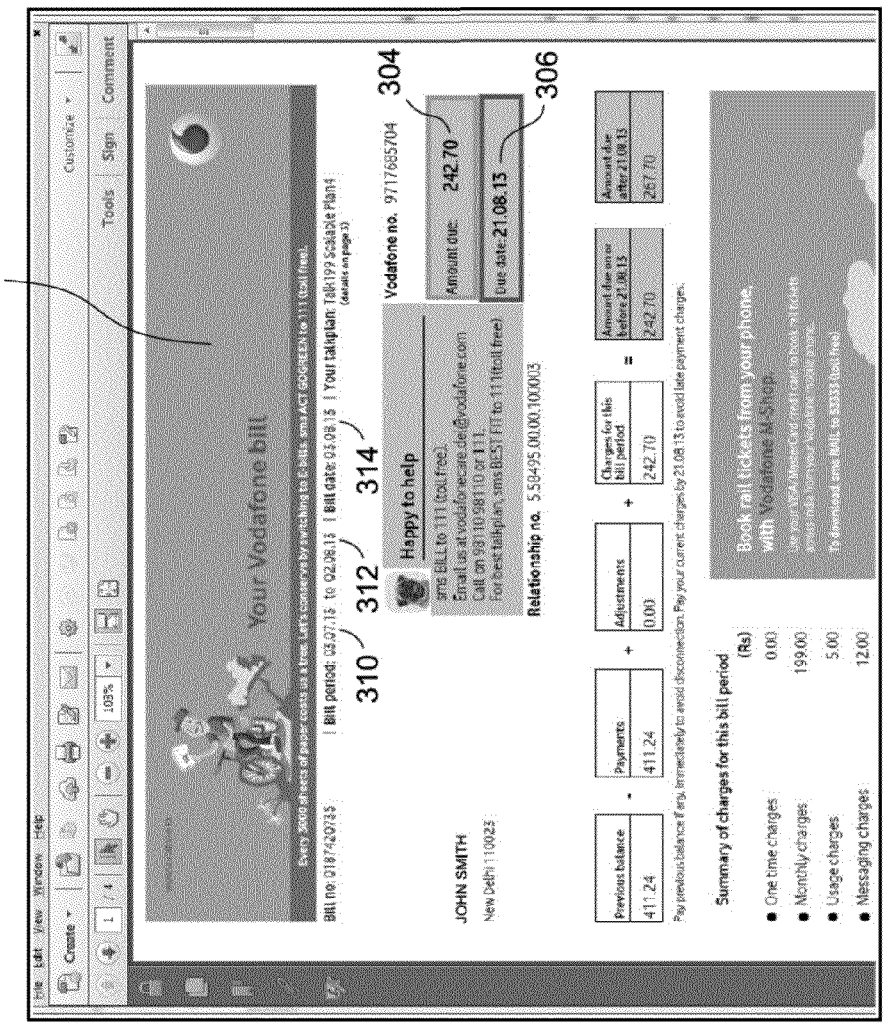
FIG. 3 illustrates a screen shot in accordance with an embodiment of the present invention.

FIG. 3 illustrates a screen shot 300 in accordance with an embodiment of the present invention. The screen shot 300 includes a telephone bill 302. The telephone bill 302 includes a due date 306 and an amount due 304. When the telephone bill 302 is opened in an application, the application retrieves one or more existing deadline profiles. The content of each of the existing deadline profiles is compared to content in the telephone bill 302 to determine whether the telephone bill 302 is from an existing vendor, of if the telephone bill 302 is a new type of bill from a new vendor.

If the content in an existing deadline profile matches the telephone bill 302, then the deadline content for the telephone bill 302 is sent to a server and stored. However, in the illustrated example, the telephone bill 302 is from a new vendor. This telephone bill 302 is the first bill received from the vendor Vodafone. Accordingly, the telephone bill 302 is searched for dates. Various date formats are searched for in the telephone bill 302. When dates are found, it is not known which date is the "due date" until a user identifies one of the found dates as the due date. More prominently displayed dates, such as dates in larger fonts or displayed in a bold font are suggested to the user as a possible due date. Dates 310 and 312 are found in a billing period field. A billing date 314 is also found in the telephone bill 302. In addition, a due date 306 is found. The telephone bill 302 is displayed with the due date 306 identified as a suggestion for a due date. The due date 306 is suggested because it is more prominently displayed in a larger font on the telephone bill 302 than the other dates 310, 312, and 314. A user may accept this suggested due date, or select another of the found dates as the due date. In addition, the user may select other content to be stored with the due date, such as the amount due field 304.

Once the content is selected, a deadline profile is generated and stored on a cloud server. In some embodiments, the deadline profile is named in such a manner that the document name may be associated with the deadline profile, for example, using a keyword common to both the new deadline profile and the document name. In addition, the deadline content is extracted and stored to be viewed by the user or used to send reminders to the user.

If at a later date, a next month's telephone bill is received from the vendor Vodafone, the content in the deadline profile is compared to content in the next month's telephone bill. A match will be found at which time the deadline content is automatically sent to the server without any manual intervention by the user.

The embodiments of the present invention may be embodied as methods, apparatus, electronic devices, and/or computer program products. Accordingly, the embodiments of the present invention may be embodied in hardware and/or in software (including firmware, resident software, micro-code, etc.), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium include the following: hard disks, optical storage devices, a transmission media such as those supporting the Internet or an intranet, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java®, Smalltalk or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

The methods described herein may be implemented in software, hardware, or a combination thereof, in different embodiments. In addition, the order of methods may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A computer implemented method comprising:
extracting deadline content from a document;
comparing the extracted deadline content to content in one or more deadline profiles; and
providing for storage on a cloud server, the extracted deadline content when the extracted deadline content matches the content in an existing deadline profile.

2. The method of claim 1, further comprising, providing for storage the extracted deadline content and a new deadline profile for the document when the extracted deadline content does not match an existing deadline profile.

3. The method of claim 1, further comprising sending reminders of deadlines based on the extracted deadline content, wherein reminders are sent at a pre-defined periodicity, where the reminders are sent at an increasing frequency as a deadline approaches.

4. The method of claim 1, wherein the deadline profile comprises a location of deadline information in the document and a content type of the deadline information.

5. The method of claim 1, wherein comparing comprises matching a content type and a location of content in the document to a content type and a location of content in the deadline profile.

6. The method of claim 1, wherein deadline content for a document is initially determined via input from a user interface.

7. The method of claim 6, wherein deadline content includes at least a deadline and one or more items of other content in the document.

8. An apparatus for managing deadline content in a document comprising:
a computer having one or more processors and further comprising:
a deadline processing module for extracting deadline content from a document, comparing the extracted deadline content to content in one or more existing deadline profiles, and providing for storage on a cloud server, at least one of the extracted deadline content when the extracted deadline content matches the content in an existing deadline profile, or the extracted deadline content and a new deadline profile for the document when the extracted deadline content does not match an existing deadline profile.

9. The apparatus of claim 8, further comprising sending reminders of deadlines based on the extracted deadline content.

10. The apparatus of claim 8, wherein the deadline profile comprises a location of deadline information in the document and a content type of the deadline information.

11. The apparatus of claim 8, wherein comparing comprises matching a content type and a location of content in the document to a content type and a location of content in the deadline profile.

12. The apparatus of claim 9, wherein reminders are sent at a pre-defined periodicity, where the reminders are sent at an increasing frequency as a deadline approaches.

13. The apparatus of claim 8, wherein deadline content for a document is initially determined via input from a user interface, and wherein deadline content includes at least a deadline and one or more items of other content in the document.

14. A non-transient computer readable medium for storing computer instructions that, when executed by at least one processor causes the at least one processor to perform a method for managing deadline content in a document comprising:

extracting deadline content from a document;

comparing the extracted deadline content to content in one or more existing deadline profiles; and providing for storage on a cloud server, the extracted deadline content and a new deadline profile for the document when the extracted deadline content does not match an existing deadline profile.

15. The computer readable medium of claim 14, further comprising providing the extracted deadline content when the extracted deadline content matches the content in an existing deadline profile.

16. The computer readable medium of claim 14, further comprising sending reminders of deadlines based on the extracted deadline content, wherein reminders are sent at a pre-defined periodicity, where the reminders are sent at an increasing frequency as a deadline approaches.

17. The computer readable medium of claim 14, wherein the deadline profile comprises a location of deadline information in the document and a content type of the deadline information.

18. The computer readable medium of claim 14, wherein comparing comprises matching a content type and a location of content in the document to a content type and a location of content in the deadline profile.

19. The computer readable medium of claim 14, wherein deadline content for a document is initially determined via input from a user interface.

20. The computer readable medium of claim 19, wherein deadline content includes at least a deadline and one or more items of other content in the document.

\* \* \* \* \*